Patent 2,766,309

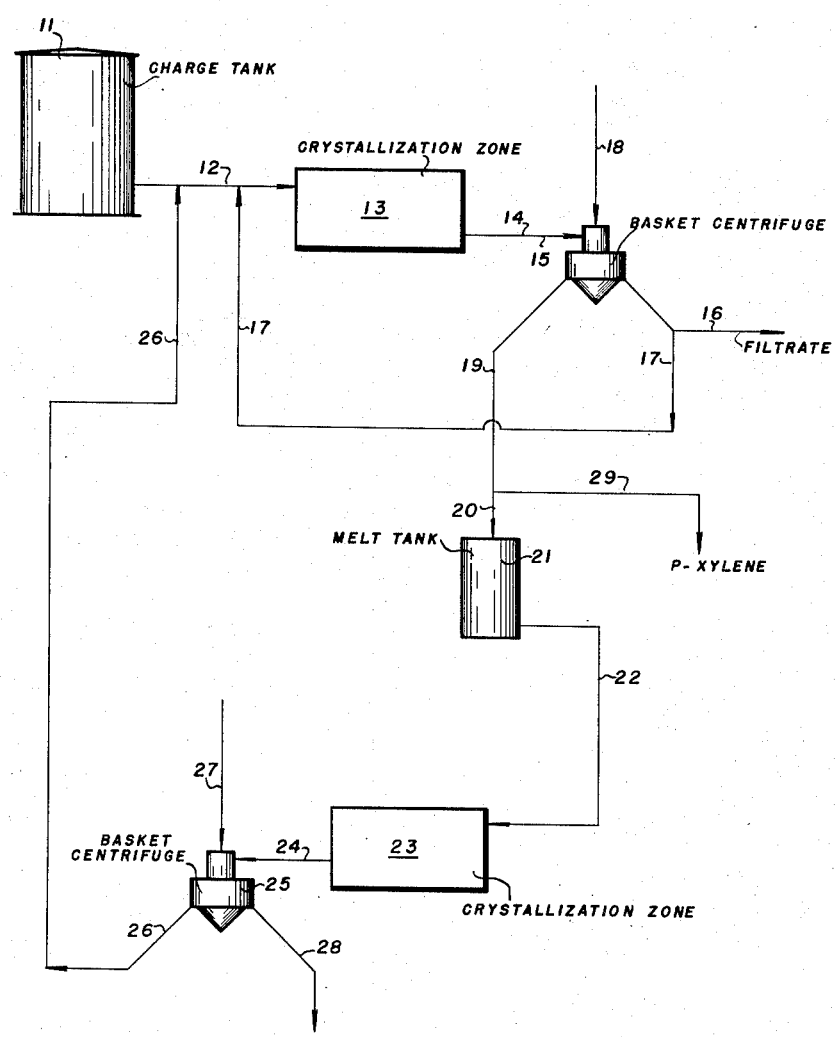

2,766,309
WASH TECHNIQUE FOR PARAXYLENE PROCESS

Raymond A. Speed and Rufus B. Bennett, Baytown, Tex., assignors, by mesne assignments, to Esso Research and Engineering Company, Elizabeth, N. J., a corporation of Delaware Application May 23, 1952, Serial No. 289,503

2 Claims. (Cl. 260—674)

The present application is directed to a process for recovering high purity paraxylene from a hydrocarbon mixture containing paraxylene and at least one other isomeric xylene.

Processes are known for obtaining a mixture of xylenes. As a specific example, in the petroleum refining art, it is possible by subjecting fractions to hydroforming and then to distillation to obtain a mixture of isomeric xylenes in which the paraxylene is present in an amount of about 16%.

The present invention is directed to a procedure for recovering a high paraxylene content product from a feed stock containing a low concentration of paraxylene, for example 12 to 25% paraxylene by volume.

Briefly, the process of the present invention is as follows:

A feed stock which contains paraxylene in an amount within the range of about 12 to 25% by volume is treated to form a slurry of paraxylene crystals at a temperature above that at which a eutectic is formed with paraxylene and the next most easily precipitated component of the feed stock. This slurry is subjected to a separating step where a filter cake is formed consisting of paraxylene crystals and mother liquor. The mother liquor contains a substantial amount of non-paraxylene materials. In accordance with the present invention, a wash liquid containing from 30 to 60% paraxylene is used to wash the cake whereby at least a major portion of the mother liquor is displaced from the filter cake so that a paraxylene concentrate containing 95% or more of paraxylene is obtained with a single separating step. If desired, the high content paraxylene filter cake may be subjected to an additional purification step including the steps of forming a second slurry of paraxylene crystals, subjecting said second slurry to a separating step to form a second filter cake of paraxylene crystals and mother liquor and washing the second filter cake with a wash liquid containing from 60 to 90% paraxylene to displace at least a major portion of the mother liquor from the second filter cake. By using this procedure a product having a paraxylene content of 98% and higher is obtained in two separation stages.

The procedure of the present invention will now be explained in conjunction with the drawing in which the sole figure is in the form of a diagrammatic flow sheet.

Referring now to the drawing, a feed stock consisting of a liquid mixture of hydrocarbons which may contain paraxylene in an amount of about 12 to 25% by volume, together with ethylbenzene, metaxylene and orthoxylene is withdrawn from charge tank 11 by line 12 and passes to a crystallization step 13. It will be understood that while the crystallization step 13 is indicated as a single rectangle, this is for diagrammatic purposes only. It will be understood that several stages of a chilling and a seeding technique, such as disclosed in our copending application entitled "Seeding and Filter Aid Technique for Paraxylene Production," Serial No. 289,502, filed May 23, 1952 may be employed for the crystallization stage indicated at 13. The result of crystallization stage 13 is to produce a slurry of paraxylene crystals at a temperature above that at which a eutectic would be formed by the paraxylene and the next most easily precipitated component. The paraxylene slurry is withdrawn from crystallization step 13 through line 14 and passed to a separating step 15 where it is separated into a filtrate fraction and a filter cake fraction consisting of the paraxylene crystals and mother liquor. In the drawing the separating step 15 is shown as carried out in a basket centrifuge with the filtrate removed through outlet line 16.

The filter cake in separating step 15 is washed with a hydrocarbon wash liquid introduced into the separating zone through inlet line 18. The wash liquid contains paraxylene in an amount substantially greater than that present in the slurry charged to the feed stock and no greater than approximately 60%. The preferable range is from 30 to 60% paraxylene with a 50% paraxylene content being most satisfactory. For economic reasons, it is desirable to recycle the spent wash liquid by means of lines 16 and 17 to line 12 where it is admixed with fresh feed stock. While a procedure for forming a wash liquid is not indicated in the drawing, a simple method is to employ a portion of feed stock from charge tank 11 and dissolve therein a portion of the paraxylene product from the separating step 15.

The washed filter cake is withdrawn from separating zone 15 through outlet 19 and may be withdrawn as product from a system through line 29.

However, as an alternative procedure the paraxylene may be further purified in a second crystallization and washing step. If a second step is used, the paraxylene passes from line 19 through line 20 to melt tank 21 where it is melted to form a melt and the melt passed through line 22 to a second crystallization step 23. In step 23 the melt is treated to form a slurry of paraxylene crystals. It will be understood that while crystallization step 23 is indicated as a single rectangle on the drawing that actually the procedure may involve several steps such as indicated in the second step of crystallization in our copending patent application entitled "Seeding and Filter Aid Technique for Paraxylene Production," Serial No. 289,502, filed May 23, 1952, heretofore mentioned. The slurry formed in crystallization step 23 is removed through line 24 and passed to second separating zone 25. In separating zone 25 the slurry is separated into a filtrate fraction which is removed by line 26 and is preferably recycled to line 12 and a filter cake fraction consisting of paraxylene crystals and mother liquor which is retained in the separating zone 25. The filter cake fraction in the separating zone 25 is washed with a hydrocarbon wash liquid containing paraxylene in an amount within the range of about 60 to 90%. The wash liquid is introduced through inlet line 27 and the spent wash liquid passes into line 26, the same outlet line used to withdraw the filtrate and like the filtrate is passed into line 12 to be returned to the first crystallization step 13. The washed filter cake having a paraxylene content of 98% or better is removed from separating zone 25 through outlet 28 as the product.

The advantages of the present invention will be further illustrated by the following example:

EXAMPLE

A hydrocarbon feed stock containing approximately 15.7% paraxylene in admixture with substantial amounts of metaxylene, orthoxylene and ethylbenzene, as well as some toluene was chilled from atmospheric temperature to −90° F. with a slurry chilling time of one and one-half hours and the slurry was then held at this temperature an additional hour. The slurry was then divided into four equal amounts which were then used in the runs set out in the following table. In carrying out run 1, no wash was used, while runs 2, 3, and 4 are in accordance with the present invention, differing in the volume of wash liquid used.

Table

| Run No. | 1 | 2 | 3 | 4 |
|---|---|---|---|---|
| Paraxylene Wash Liquid: | | | | |
| Temp. of Wash, °F | (1) | 34 | 34 | 36 |
| Paraxylene Content of Wash, Wt. Percent | (1) | 50 | 50 | 50 |
| Vol. Wash/Vol. of Feed | | 0.13 | 0.31 | 0.47 |
| Product Purity, Wt. Percent Paraxylene | 93.2 | 95.0 | 95.0 | 96.4 |
| Total Centrifuge Spin Time @ 900 g's | (2) | (2) | (2) | (2) |
| Condition of Cake; Glazing | None | Slight | Slight | Hard |
| Cenrifuge: | | | | |
| Charge Time, Sec | 30 | 30 | 30 | 30 |
| Spin Before Wash, Sec | | 5 | 5 | 5 |
| Spin During Wash, Sec | | 5 | 7 | 15 |
| Spin After Wash, Sec | 120 | 120 | 120 | 120 |

1 No wash.
2 2 min., 20 sec.

The data from the preceding table show that 95% purity paraxylene may be produced in a single separating stage operation with a short centrifuging time and a relatively small amount of wash liquid and that by using a ratio of approximately one volume of wash liquid to two volumes of feed over 96% purity paraxylene may be obtained.

In explanation of the high purity paraxylene product obtained, it was noted that the cake produced in run 1 without being washed in accordance with the procedure of the present invention contains nearly 8% mother liquor which has a paraxylene content of approximately 8%. If this 8% mother liquor is replaced with wash liquid containing 50% paraxylene, it is estimated that a 96.5% purity cake may be produced as a final product provided a 100% displacement of the mother liquor is realized. This figure was approached very closely in run 4.

It is to be noted that the washing of the filter cakes in the example was carried out at temperatures of approximately 30° F. Because of these temperatures, the paraxylene content of the wash liquid cannot be substantially greater than 60% without causing severe glazing of the filter cake.

However, in the second stage operation the filter cake is at a higher temperature and a higher washing temperature may be employed. For example, the separating step may be carried out at a temperature within the range of −15° to +15° F., preferably 0° F. and the filter cake may be washed with a wash liquid at 40° F. This enables a wash liquid having a paraxylene content within the range of 60 to 90% to be employed without causing severe glazing of the filter cake in the second separating stage and allows a product to be obtained having a paraxylene content of 98% or even higher.

While we have disclosed specific methods for carrying out the present invention, it will be obvious to a workman skilled in the art that various changes may be made without departing from the scope of the invention.

We claim:

1. A method for obtaining a high paraxylene content product from a hydrocarbon feed stock having from about 12 to 25% paraxylene and at least one other isomeric xylene including the steps of forming a slurry of paraxylene crystals from said feed stock at a temperature above the eutectic point of paraxylene with the next most easily precipitated component, subjecting said slurry to a separating step to form a filter cake consisting of paraxylene crystals and mother liquor, washing said filter cake with a wash liquid containing from about 30 to 60% paraxylenes to displace at least a major portion of the mother liquor from the filter cake, removing the filter cake from said separating step, melting the filter cake to form a melt, forming from said melt a second slurry of paraxylene crystals, subjecting said second slurry of paraxylene crystals to a second separating step to form a second filter cake consisting of paraxylene crystals and mother liquor and washing said second cake with a hydrocarbon wash liquid containing from 60 to 90% paraxylene to replace at least a major portion of the mother liquor from said second filter cake and recovering said washed second filter cake as a high paraxylene content product.

2. A method in accordance with claim 1 in which the wash liquid used to wash the first filter cake contains about 50% paraxylene and in which the wash liquid used to wash the second filter cake contains about 75% paraxylene.

References Cited in the file of this patent

UNITED STATES PATENTS

| 2,511,711 | Hetzner et al. | June 13, 1950 |
| 2,533,232 | Dressler | Dec. 12, 1950 |
| 2,541,682 | Arnold | Feb. 13, 1951 |
| 2,614,134 | Powers | Oct. 14, 1952 |